US012265347B2

(12) United States Patent
Iguchi et al.

(10) Patent No.: US 12,265,347 B2
(45) Date of Patent: Apr. 1, 2025

(54) IMAGE FORMING APPARATUS THAT PERFORMS IMAGE CORRECTIONS BASED ON TEST IMAGES AND CONTROL METHOD FOR IMAGE FORMING APPARATUS

(71) Applicant: Toshiba Tec Kabushiki Kaisha, Tokyo (JP)

(72) Inventors: Ken Iguchi, Numazu Shizuoka (JP); Suguru Kurita, Sunto Shizuoka (JP); Satoshi Araki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/348,037

(22) Filed: Jul. 6, 2023

(65) Prior Publication Data

US 2024/0192624 A1 Jun. 13, 2024

(30) Foreign Application Priority Data

Dec. 8, 2022 (JP) ................................ 2022-196512

(51) Int. Cl.
*G03G 15/00* (2006.01)
*G03G 15/043* (2006.01)

(52) U.S. Cl.
CPC ....... *G03G 15/5041* (2013.01); *G03G 15/043* (2013.01); *G03G 15/5045* (2013.01); *G03G 2215/047* (2013.01)

(58) Field of Classification Search
CPC ............ G03G 15/5041; G03G 15/043; G03G 15/5045; G03G 2215/047
See application file for complete search history.

(56) References Cited

U.S. PATENT DOCUMENTS

2011/0091235 A1* 4/2011 Oh .................... G03G 15/5041 399/74
2018/0239271 A1* 8/2018 Suzuki ................ G03G 15/043

FOREIGN PATENT DOCUMENTS

JP 6562786 B2 8/2019

* cited by examiner

*Primary Examiner* — Sandra Brase
(74) *Attorney, Agent, or Firm* — Kim & Stewart LLP

(57) ABSTRACT

According to an embodiment, an image forming apparatus includes an image forming device, a scanning device, and a controller. The image forming device forms a first test image and forms a second test image. The scanning device scans the first test image with a first amount of emitted light corresponding to a first input value and scans the second test image with a second amount of emitted light corresponding to a second input value. The controller selectively executes any one of a first correction process, a second correction process, or a third correction process on the basis of an event change.

10 Claims, 10 Drawing Sheets

Fig.5

<Automatic correction>

| Execution condition (Event change) | Number of images | 1000 | 2000 | 3000 | 4000 | 5000 | ··· | 9000 | 10000 | 11000 | ··· |
|---|---|---|---|---|---|---|---|---|---|---|---|
| | Temperature change | - | | | | | Condition matching | - | | | |
| Image density correction(A) (First amount of emitted light by first input value) | | Done | Done | Done | Done | Done | ··· | Done | Done | Done | ··· |
| First light amount correction(a) (Correct first input value) | | - | - | - | - | - | ··· | - | Done | - | ··· |
| Color distortion correction(B) (Second amount of emitted light by second input value) | | - | | | | | Done | - | | | |
| Second light amount correction(b) (Correct second input value) | | Done | Done | Done | Done | Done | ··· | Done | - | Done | ··· |

First correction process: (a) + (A), second correction process: (b) + (A), third correction process: (B)

Fig.6

<Automatic correction>

| | | | | | | | | | | | |
|---|---|---|---|---|---|---|---|---|---|---|---|
| Execution condition (Event change) | Number of images | 1000 | 2000 | 3000 | 4000 | 5000 | ... | 9000 | 10000 | 11000 | ... |
| | Temperature change | – | | | | | Condition matching | – | | | |
| Image density correction(A) (First amount of emitted light by first input value) | | Done | Done | Done | Done | Done | ... | Done | Done | Done | ... |
| First light amount correction(a) (Correct first input value) | | – | – | – | – | – | ... | – | Done | – | ... |
| Color distortion correction(B) (Second amount of emitted light by second input value) | | – | | | | | Done | – | | | |
| Second light amount correction(b) (Correct second input value) | | Done | – | Done | – | Done | ... | Done | – | Done | ... |

First correction process: (a) + (A), second correction process: (b) + (A), third correction process: (B), fourth correction process: (A)

Fig.7

<Manual correction>

| Execution condition (Operation input) | First Correction Instruction | Second Correction Instruction | Third Correction Instruction | Fourth Correction Instruction | Fifth Correction Instruction | Sixth Correction Instruction | Seventh Correction Instruction | Eighth Correction Instruction | Ninth Correction Instruction |
|---|---|---|---|---|---|---|---|---|---|
| Image density correction(A) (First amount of emitted light by first input value) | Done | ~ | ~ | ~ | Done | ~ | Done | Done | Done |
| First light amount correction(a) (Correct first input value) | ~ | ~ | Done | ~ | Done | ~ | ~ | Done | Done |
| Color distortion correction(B) (Second amount of emitted light by second input value) | ~ | Done | ~ | ~ | ~ | Done | ~ | ~ | Done |
| Second light amount correction(b) (Correct second input value) | ~ | ~ | ~ | Done | ~ | Done | Done | Done | Done |

IMAGE FORMING APPARATUS THAT PERFORMS IMAGE CORRECTIONS BASED ON TEST IMAGES AND CONTROL METHOD FOR IMAGE FORMING APPARATUS

CROSS-REFERENCE TO RELATED APPLICATIONS

This application is based upon and claims the benefit of priority from the prior Japanese Patent Application No. 2022-196512, filed on Dec. 8, 2022, the entire contents of which are incorporated herein by reference.

FIELD

An embodiment described here generally relates to an image forming apparatus and a control method for an image forming apparatus.

BACKGROUND

An electrophotographic image forming apparatus has some correction functions for maintaining the image quality. For example, there are known as correction functions of image density correction of correcting non-uniformity of image density and the like and color distortion correction of correcting color distortion such as transferring positions of YMCK colors (yellow, magenta, cyan, key (black)).

The image forming apparatus forms a test pattern for image density correction or a test pattern for color distortion correction on an intermediate transfer belt, scans the test patterns through a sensor, and corrects the density or color distortion on the basis of the scanning results.

The image density correction and the color distortion correction have different objectives. Therefore, in a known method, the amount of emitted light from the sensor is varied between the image density correction and the color distortion correction depending on their objectives.

Since image forming apparatuses have individual differences due to their design, they have to correct the amount of emitted light from the sensor in order to correct each of the image density and the color distortion. One of known methods of correcting the amount of emitted light from the sensor is binary search. Simply using the binary search for correcting the amount of light for each type of correction, however, takes time for correcting the amount of light, resulting in increased printing standby time.

BRIEF DESCRIPTION OF THE DRAWINGS

FIG. 5 is a diagram showing a first example of an execution time (cycle) of automatic correction according to the embodiment.

FIG. 6 is a diagram showing a second example of an execution time (cycle) of the automatic correction according to the embodiment.

FIG. 7 is a diagram showing an example of manual correction according to the embodiment.

DETAILED DESCRIPTION

Figure 1:
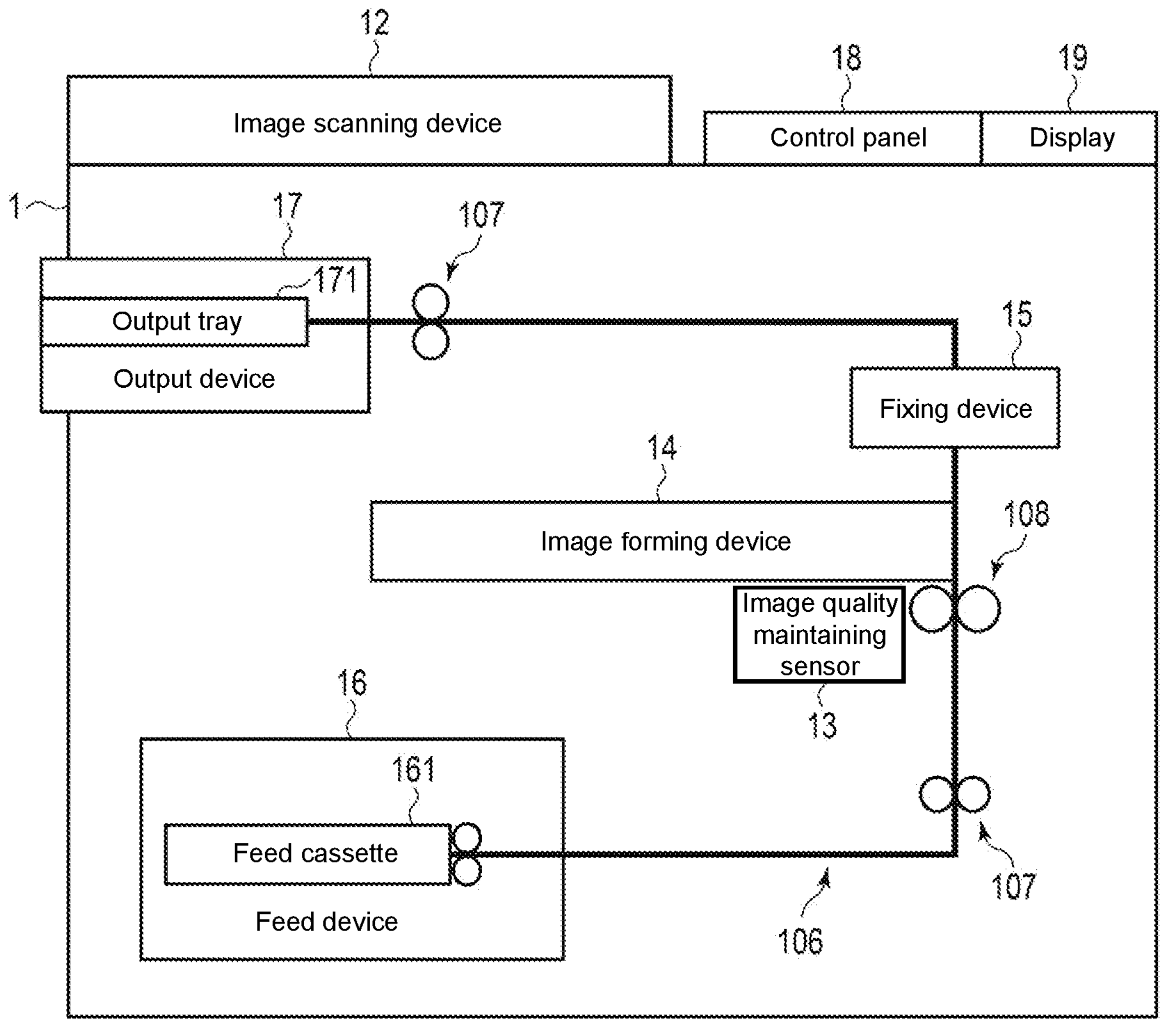
FIG. 1 is a schematic cross-sectional view showing an example of an image forming apparatus according to an embodiment.

In accordance with one embodiment, an image forming apparatus forms an image with a plurality of colors. The image forming apparatus includes an image forming device, a scanning device, and a controller. The image forming device forms a first test image on the basis of first test image data associated with a plurality of colors and forms a second test image on the basis of second test image data associated with a plurality of colors. The scanning device scans the first test image with a first amount of emitted light corresponding to a first input value and scans the second test image with a second amount of emitted light corresponding to a second input value. The controller selectively executes any one of a first correction process, a second correction process, or a third correction process on the basis of an event change. The first correction process includes a first light amount correction process of correcting the first input value so as to maintain the first amount of emitted light and an image density correction process of correcting density of the image to be formed on the basis of a result of scanning the first test image. The second correction process includes a second light amount correction process of correcting the second input value so as to maintain the second amount of emitted light and the image density correction process. In addition, the third correction process includes a color distortion correction process of correcting color distortion of the image to be formed on the basis of a result of scanning the second test image.

Hereinafter, an embodiment will be described with reference to the drawings. It should be noted that the scales of the respective portions are varied as appropriate in each of the drawings used for describing the embodiment below. In the drawings, the same reference signs denote the same or similar portions. Moreover, some configurations are omitted as appropriate for the sake of description in each of the drawings used for describing the embodiment below.

Configuration

FIG. 1 is a schematic cross-sectional view showing an example of an image forming apparatus according to the embodiment. An image forming apparatus 1 prints an image by electrophotography. The image forming apparatus 1 is, for example, a multifunction peripheral (MFP). The image forming apparatus 1 includes an image scanning device 12, an image quality maintaining sensor 13, an image forming device 14, and a fixing device 15.

The image scanning device 12 scans an image of a document placed on a document table and outputs scanned image data corresponding to the document image. The image forming device 14 forms an output image based on the scanned image data or input image data on a sheet. The fixing device 15 heats the sheet so as to fix the formed image on the sheet.

The image quality maintaining sensor 13 has a light-emitting portion and a light-receiving portion. The light-emitting portion emits an amount of light corresponding to an input value (input voltage). The light from the light-emitting portion is emitted to the surface of the intermediate transfer belt. The light-receiving portion receives reflected light from the belt surface and outputs an output value (output voltage) depending on the amount of received light.

That is, the image quality maintaining sensor 13 functions as a scanning unit and uses the light-emitting portion and the light-receiving portion for scanning an image of a first test pattern for image density correction or an image of a second test pattern for color distortion correction, which is formed on the intermediate transfer belt. The density of the image to be formed is corrected based on the scanning result of the first test pattern image. The color distortion of the image to be formed is corrected based on the scanning result of the second test pattern image.

The image forming apparatus 1 further includes a feed device 16, an output device 17, a conveying path 106, a conveying roller 107, and a registration roller 108. The feed device 16 includes a plurality of feed cassettes 161. Each of the feed cassettes 161 stores a plurality of sheets. The feed device 16 feeds the plurality of sheets stored in the feed cassettes 161 one by one. The conveying roller 107 conveys the sheet toward the output device 17 from the feed device 16 along the conveying path 106. The registration roller 108 passes the sheet to the image forming device 14. The output device 17 includes an output tray 171. The output tray 171 receives the output sheet.

The image forming apparatus 1 further includes a control panel 18 and a display 19. The control panel 18 receives inputs from a user or serviceman. For example, the control panel 18 receives a correction instruction for image density correction or a correction instruction for color distortion correction. The display 19 displays a variety of information. It should be noted that a touch panel with display and input functions may constitute the control panel 18 and the display 19.

Figure 2:
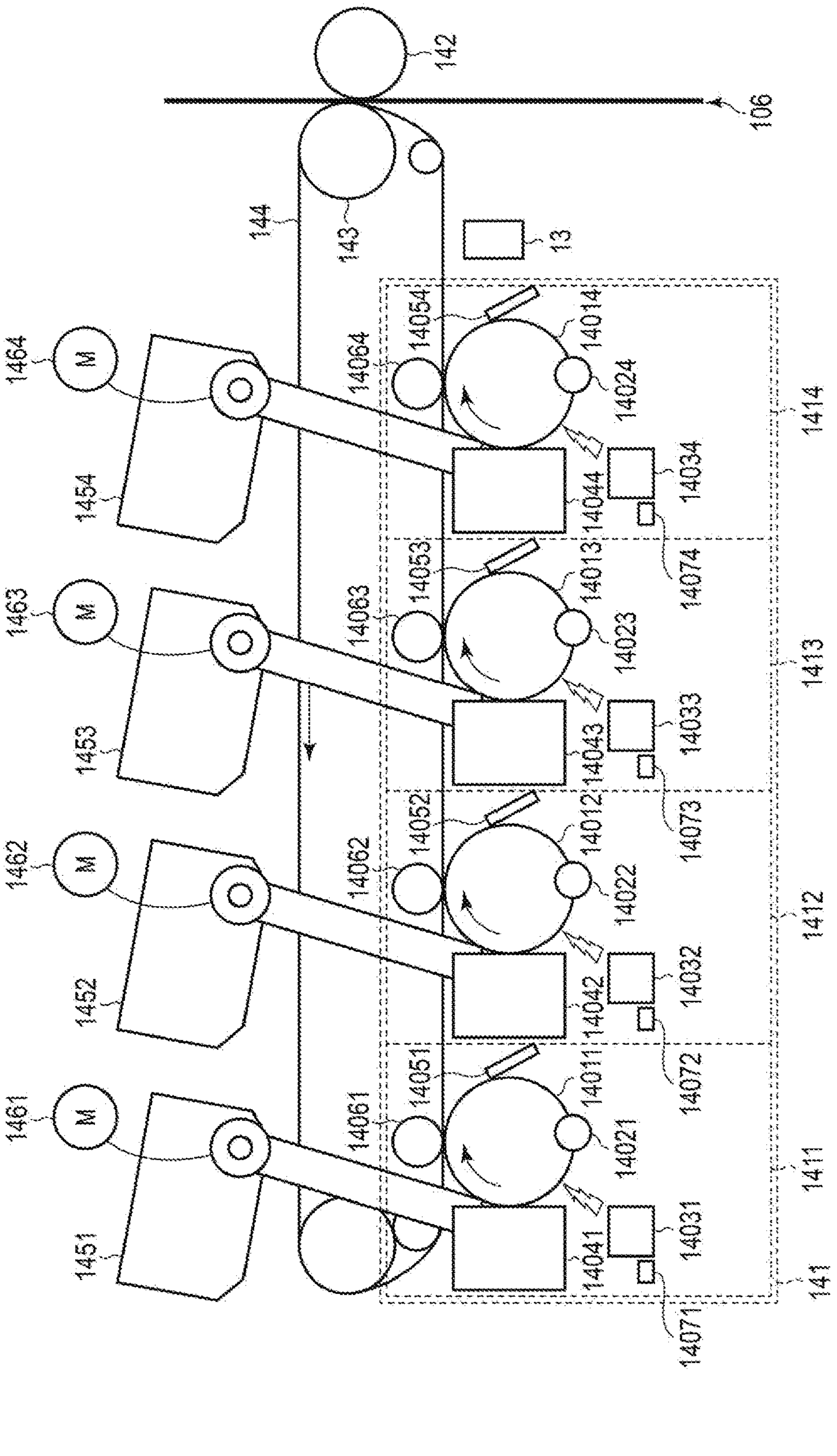
FIG. 2 is a schematic cross-sectional view showing an example of an image formation unit according to the embodiment and its periphery.

FIG. 2 is a schematic cross-sectional view showing an example of the image formation unit according to the embodiment and its periphery. The image forming device 14 includes a process device 141 associated with a plurality of colors. For example, the process device 141 includes a process device 1411 associated with yellow, a process device 1412 associated with magenta, a process device 1413 associated with cyan, and a process device 1414 associated with black.

Moreover, the image forming device 14 includes a toner cartridge 1451 and a toner feeding motor 1461 that are associated with the process device 1411, a toner cartridge 1452 and a toner feeding motor 1462 that are associated with the process device 1412, a toner cartridge 1453 and a toner feeding motor 1463 that are associated with the process device 1413, and a toner cartridge 1454 and a toner feeding motor 1464 that are associated with the process device 1414.

The toner cartridge 1451 has yellow toner to fill it. The toner feeding motor 1461 rotates a rotational stirring member provided inside the toner cartridge 1451 and makes the toner fall into a developing device 14041 through a tube. In this manner, the toner feeding motor 1461 feeds the toner filling the toner cartridge 1451 to the developing device 14041.

The toner cartridge 1452 has magenta toner to fill it. The toner cartridge 1453 has cyan toner to fill it. The toner cartridge 1454 has black toner to fill it. The toner feeding motor 1462 feeds the toner filling the toner cartridge 1452 to a developing device 14042. The toner feeding motor 1463 feeds the toner filling the toner cartridge 1453 to a developing device 14043. The toner feeding motor 1464 feeds the toner filling the toner cartridge 1454 to a developing device 14044.

It should be noted that toner colors handled by the image forming apparatus 1 are not limited to the above four colors and the image forming apparatus 1 may handle other colors. Moreover, toner handled by the image forming apparatus 1 may be special toner. The special toner may be decolorable toner that loses color and becomes invisible at a temperature higher than a predetermined temperature.

In addition, the image forming device 14 includes the process device 141, a secondary transfer roller 142, a secondary transfer opposite roller 143, and an intermediate transfer belt 144. It should be noted that the image quality maintaining sensor 13 is disposed facing the belt surface of the intermediate transfer belt 144.

The process device 141 forms a toner image on the intermediate transfer belt 144, which is an endless belt, on the basis of image data. That is, the process device 1411, the process device 1412, the process device 1413, and the process device 1414 form toner images in respective colors on the intermediate transfer belt 144 on the basis of the image data.

The secondary transfer opposite roller 143 faces the secondary transfer roller 142 while sandwiching the intermediate transfer belt 144. The secondary transfer opposite roller 143 and the secondary transfer roller 142 sandwich a sheet therebetween and conveys the sheet with the transferred image.

The process device 1411 includes a photosensitive drum 14011, a charger 14021, a light exposure device 14031, the developing device 14041, a photosensitive drum cleaner 14051, a primary transfer roller 14061, and a thermal sensor 14071. The process device 1412 has similar configurations 14012, 14022, 14032, 14042, 14052, 14062, 14072 as shown in FIG. 2. The process device 1413 has similar configurations 14013, 14023, 14033, 14043, 14053, 14063, 14073 as shown in FIG. 2. The process device 1414 has similar configurations 14014, 14024, 14034, 14044, 14054, 14064, 14074 as shown in FIG. 2.

The photosensitive drum 14011, 14012, 14013, 14014 are a columnar drum and are an image carrier that carries an electrostatic latent image on its surface. The photosensitive drum 14011, 14012, 14013, 14014 have a photosensitive matter on its outer circumferential surface and has properties of releasing static electricity at a portion irradiated with light.

The charger 14021, 14022, 14023, 14024 charge the surface of the photosensitive drum 14011, 14012, 14013, 14014 with static electricity. The charger 14021, 14022, 14023, 14024 are, for example, a needle electrode. The light exposure device 14031, 14032, 14033, 14034 form an electrostatic latent image corresponding to an image to be formed on the surface of the photosensitive drum 14011, 14012, 14013, 14014. The light exposure device 14031, 14032, 14033, 14034 are, for example, a laser-emitting device. The developing device 14041, 14042, 14043, 14044 feed toner onto the surface of the photosensitive drum 14011, 14012, 14013, 14014 and develop the electrostatic latent image with the toner.

The primary transfer roller 14061, 14062, 14063, 14064 transfer the electrostatic latent image (toner image) developed on the surface of the photosensitive drum 14011, 14012, 14013, 14014 onto the intermediate transfer belt 144. The secondary transfer roller 142 transfers the toner image on the intermediate transfer belt 144 onto a sheet.

The photosensitive drum cleaner 14051, 14052, 14053, 14054 remove residual toner on the photosensitive drum 14011, 14012, 14013, 14014. The removed toner is put into a waste toner box and disposed of.

The thermal sensor 14071, 14072, 14073, 14074 detect a temperature change of the process device 1411, 1412, 1413, 1414. For example, the thermal sensor 14071, 14072, 14073, 14074 detect are disposed near the light exposure device 14031, 14032, 14033, 14034 and detect influences of heat generated by the light exposure device 14031, 14032, 14033, 14034. Color distortion at the transfer position of each YMCK color occurs due to influences such as expansion and contraction of the parts due to a temperature change inside the apparatus. Color distortion correction is executed, triggered by a temperature change detected by the thermal sensor 14071, 14072, 14073, 14074.

Figure 3:
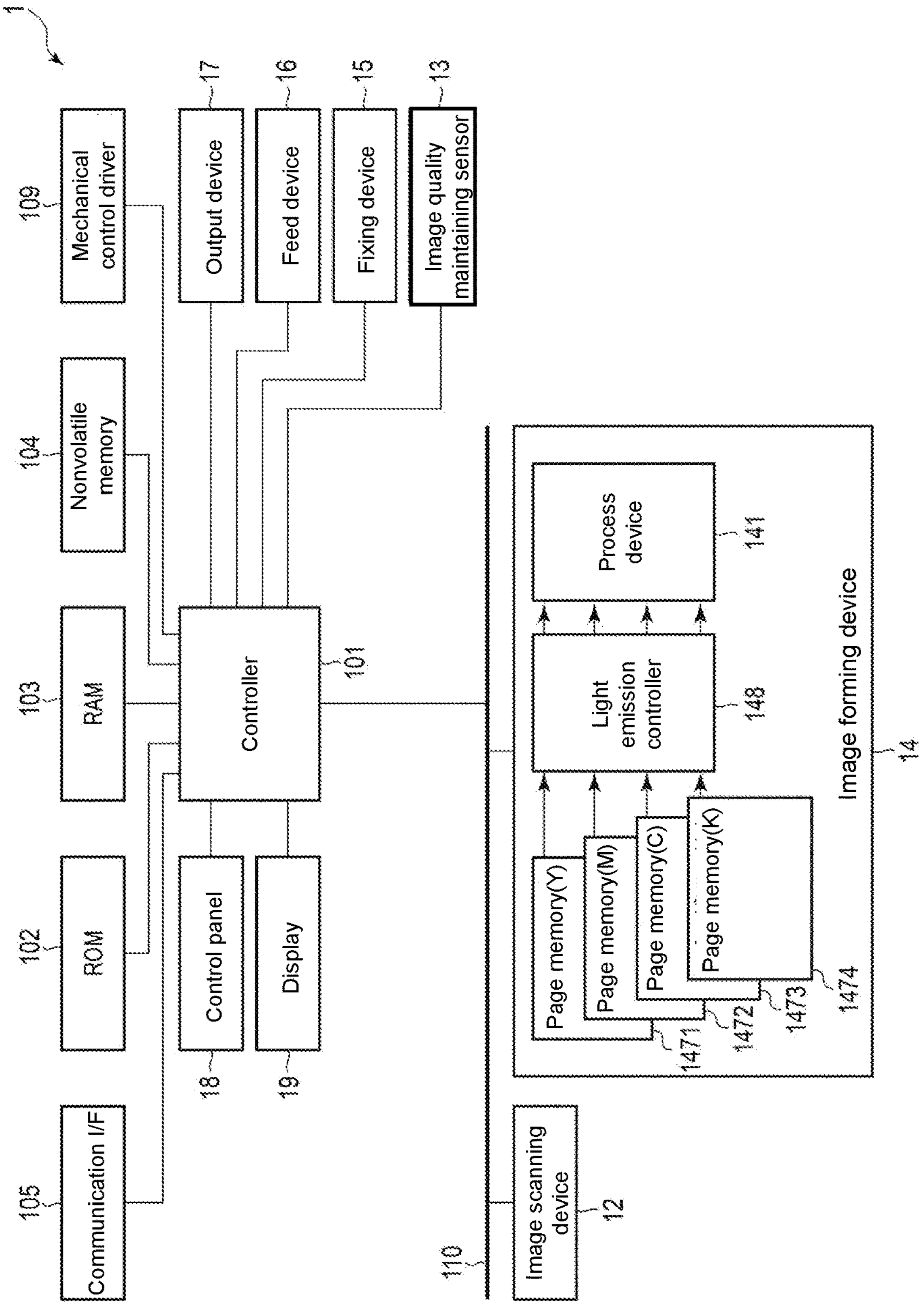
FIG. 3 is a block diagram showing an example of functions of the image forming apparatus according to the embodiment.

FIG. 3 is a block diagram showing an example of functions of the image forming apparatus according to the embodiment. As shown in FIG. 3, the image forming apparatus 1 includes the image scanning device 12, the image quality maintaining sensor 13, the image forming device 14, the fixing device 15, the feed device 16, the output device 17, the control panel 18, and the display 19. The image scanning device 12 and the image forming device 14 are connected via an image data bus 110.

The image forming device 14 include page memories 1471, 1472, 1473, 1474, a light emission controller 148, and the process device 141. The page memory 1471 outputs yellow image data contained in the scanned image data. The page memory 1472 outputs magenta image data contained in the scanned image data. The page memory 1473 outputs cyan image data contained in the scanned image data. The page memory 1474 outputs black image data contained in the scanned image data.

The light emission controller 148 is connected to each of the page memories 1471, 1472, 1473, and 1474. The yellow image data from the page memory 1471, the magenta image data from the page memory 1472, the cyan image data from the page memory 1473, and the black image data from the page memory 1474 are input to the light emission controller 148.

The light emission controller 148 controls light emission of the light exposure device 14031 on the basis of the yellow image data from the page memory 1471, controls light emission of a light exposure device 14032 on the basis of the magenta image data from the page memory 1472, controls light emission of a light exposure device 14033 on the basis of the cyan image data from the page memory 1473, and controls light emission of a light exposure device 14034 on the basis of the black image data from the page memory 1474.

In addition, the image forming apparatus 1 includes a controller 101, a read only memory (ROM) 102, a rewritable memory, random access memory (RAM) 103, a nonvolatile memory 104, a communication interface (I/F) 105, and a mechanical control driver 109.

The controller 101 connects to the respective units, outputs signals to the respective units, and inputs signals from the respective units. One or more processors constitute the controller 101. The processor is a central processing unit (CPU), a micro processing unit (MPU), a digital signal processor (DSP), or the like. The controller 101 functions as a control unit that controls operations such as image scanning and formation in accordance with various programs stored in at least one of the ROM 102 and the nonvolatile memory 104 and controls first to ninth correction processes to be described later. Moreover, the controller 101 outputs operation instructions for the motors to the mechanical control driver 109.

The ROM 102 stores some or all of various programs and various parameters required for controlling the controller 101. The RAM 103 temporarily stores data required for controlling the controller 101. The nonvolatile memory 104 stores some or all of various programs and various parameters. For example, the nonvolatile memory 104 stores input values (first and second input values) input to the light-emitting portion of the image quality maintaining sensor 13. The input values are corrected at a light amount correction time and the nonvolatile memory 104 also stores the corrected input values (first and second input values).

The mechanical control driver 109 controls operations for the motors in accordance with the operation instructions from the controller 101.

The communication interface (communication I/F) 105 communicates with an external device. For example, the communication I/F 105 inputs image data output from a personal computer, for example. The image forming device 14 forms an image based on input image data. Moreover, the communication I/F 105 sends maintenance information to a server. The server receives the maintenance information and manages the maintenance state of the image forming apparatus 1.

Operation

The image forming apparatus 1 has some correction functions for maintaining the image quality. For example, the image forming apparatus 1 has functions of image density correction of correcting non-uniformity of the image density and the like and color distortion correction of correcting the distortion of the transfer positions of dots in YMCK colors.

The controller 101, the image forming device 14, and the image quality maintaining sensor 13 cooperate to execute image density correction. In accordance with an instruction from the controller 101, the image forming device 14 forms a first test image on the intermediate transfer belt 144 on the basis of first test image data associated with a plurality of colors for image density correction. In accordance with an instruction from the controller 101, the image quality maintaining sensor 13 scans the first test pattern image for image density correction formed on the intermediate transfer belt 144 with a first amount of emitted light corresponding to the first input value. The controller 101 outputs a correction signal on the basis of the scanning result of the first test pattern image (gradation). The light emission controller 148 controls the light emission on the basis of the correction signal and the image data of each page memory.

Moreover, the controller 101, the image forming device 14, and the image quality maintaining sensor 13 cooperate to execute color distortion correction. In accordance with an instruction from the controller 101, the image forming device 14 forms a second test image on the intermediate transfer belt 144 on the basis of second test image data associated with a plurality of colors for color distortion correction. In accordance with an instruction from the controller 101, the image quality maintaining sensor 13 scans the image (color distortion) of the second test pattern for color distortion correction with a second amount of emitted light corresponding to the second input value. It should be noted that the second amount of emitted light is larger than the first amount of emitted light. The controller 101 outputs a correction signal on the basis of the scanning result of the second test pattern image. The light emission controller 148 controls the light emission on the basis of the correction signal and the image data of each page memory.

The image quality maintaining sensor 13 has an individual difference in scanning performance due to, for example, a difference in amount of emitted light from the light-emitting portion. Moreover, the performance can vary due to degradation over time or contamination. Moreover, the intermediate transfer belt 144 can have an individual difference in gloss.

The controller 101 controls each of the first and second amounts of emitted light from the image quality maintaining sensor 13 to be a target amount of emitted light in order to keep the scanning performance of the image quality maintaining sensor 13 constant. For example, the controller 101 corrects each of the first and second amounts of emitted light from the image quality maintaining sensor 13 in accordance with a method, e.g., binary search disclosed in JP 6562786 B or the like. The controller 101 controls each of the first and second amounts of emitted light from the image quality maintaining sensor 13 to be the target amount of emitted light by correcting the first and second input values.

Figure 4:
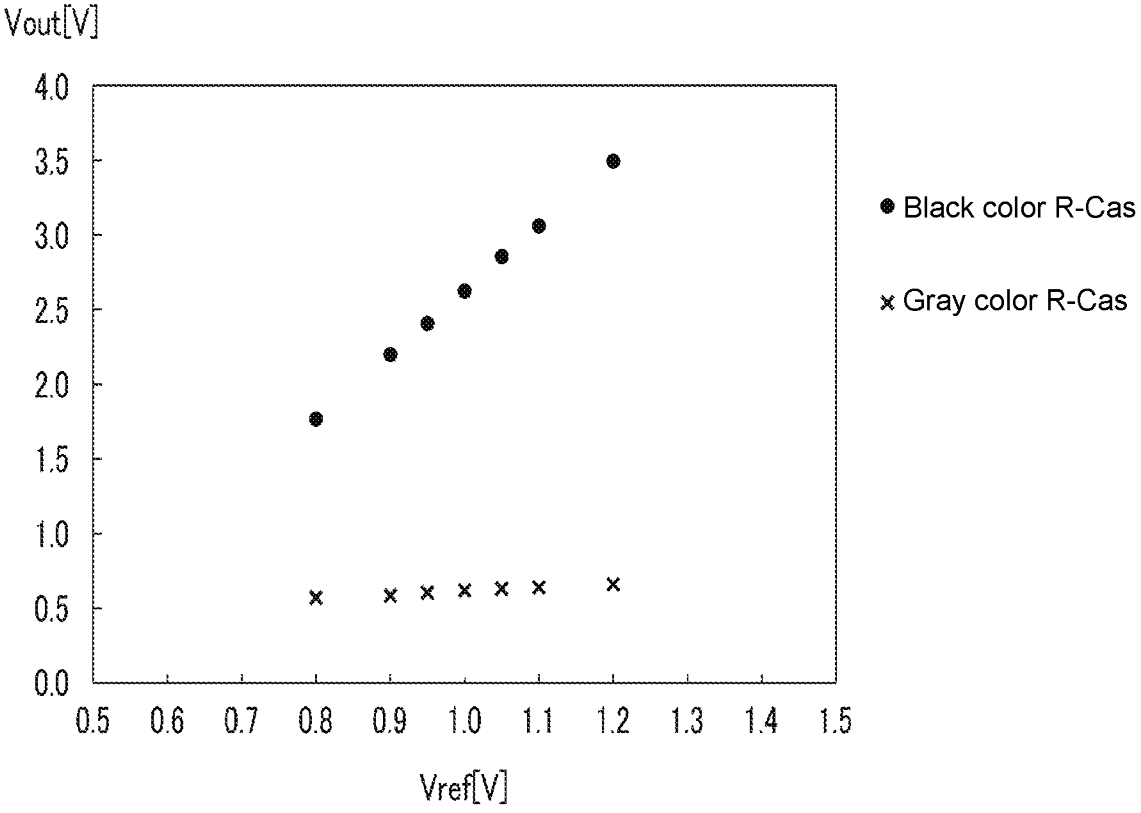
FIG. 4 is a diagram showing a relationship between an input voltage value (amount of emitted light) and an output voltage value (amount of received light) with respect to an image quality maintaining sensor according to the embodiment.

FIG. 4 is a diagram showing a relationship between an input voltage value (amount of emitted light) and an output voltage value (amount of received light) with respect to an image quality maintaining sensor according to the embodiment. The horizontal axis Vref [V] in FIG. 4 indicates the input voltage value (amount of emitted light) and the vertical axis Vout [V] indicates the output voltage value (amount of received light).

In the image density correction, the density is corrected on the basis of a detection result (output voltage value) of a toner adhering portion corresponding to the first test pattern image. On the other hand, in the color distortion correction, the color distortion is corrected on the basis of detection results (output voltage values) of change points on a toner adhering portion corresponding to the second test pattern image and the belt surface.

As shown in FIG. 4, as to the gray color as detection results of the toner adhering portion used for image density correction, the influence on the output voltage value with respect to the input voltage value is small. Meanwhile, as to the black color as detection results of change points on the toner adhering portion and the belt surface that are used for color distortion correction, the influence on the output voltage value with respect to the input voltage value is large. That is, the gloss belt surface receives a larger influence of degradation over time or contamination (decrease in amount of emitted light), which is a change factor of the amount of emitted light, than the toner adhering portion. Therefore, the image forming apparatus 1 executes second light amount correction for color distortion correction at a higher frequency than first light amount correction for image density correction.

As described above, each of the first and second amounts of emitted light from the image quality maintaining sensor 13 is corrected in accordance with a method such as binary search. However, executing both the first light amount correction of correcting the first amount of emitted light and the second light amount correction of correcting the second amount of emitted light in a series of correction processes increases the overall processing time. In view of this, the image forming apparatus 1 according to the present embodiment selectively executes either one of the first light amount correction and the second light amount correction in the series of correction processes. This prevents the overall processing time from increasing.

FIG. 5 is a diagram showing a first example of an execution time (cycle) of automatic correction according to the embodiment. The controller 101 of the image forming apparatus 1 selectively executes any one of a first correction process, a second correction process, or a third correction process on the basis of an execution condition (event change). Moreover, the controller 101 executes the second correction process at a higher frequency than the first correction process.

The respective correction processes are as follows. The first correction process includes the first light amount correction (a) of correcting the first input value so as to maintain the first amount of emitted light and the image density correction (A) based on the scanning result of the first test image scanned with the first amount of emitted light corresponding to the first input value (the first correction process: (a)+(A)).

Moreover, the second correction process includes the second light amount correction (b) of correcting the second input value so as to maintain the second amount of emitted light and the image density correction (A) based on the scanning result of the first test image scanned with the first amount of emitted light corresponding to the first input value (the second correction process: (b)+(A)).

Moreover, the third correction process includes the color distortion correction (B) based on the scanning result of the second test image scanned with the second amount of emitted light corresponding to the second input value (the third correction process: (B)).

The controller 101 selectively executes either one of the first correction process and the second correction process in accordance with a first event change and also executes the third correction process in accordance with a second event change. The first event change is an actual result (number of images) that the output images have been formed. The second event change is a temperature change detected by the thermal sensor 14071, 14072, 14073, 14074.

For example, as shown in FIG. 5, when the number of images as the formed output images has reached 1,000, the controller 101 executes the second correction process at a time when the number of images as the formed output images has reached 1,000, at a time when a series of image formation operations that has reached 1,000 ends, or at an arbitrary time before the next image formation operation starts after this series of image formation operations ends. For example, the controller 101 executes the second light amount correction (b) (corrects the second input value) and then executes the image density correction (A) based on the scanning result of the first test image scanned with the first amount of emitted light corresponding to the first input value.

Similarly, the controller 101 executes the second correction process when the number of images as the formed output images has reached 2,000 or 3,000.

Moreover, when the number of images as the formed output images has reached 10,000, the controller 101 executes the first correction process at a time when the number of images as the formed output images has reached 10,000, at a time when a series of image formation operations by which the number of images as the formed output images has reached 10,000 ends, or at an arbitrary time before the next image formation operation starts after this series of image formation operations ends. For example, the controller 101 executes the first light amount correction (a) (corrects the first input value) and then executes the image density correction (A) based on the scanning result of the first test image scanned with the first amount of emitted light corresponding to the corrected first input value.

Similarly, the controller 101 executes the first correction process when the number of images as the formed output images has reached 20,000 or 30,000.

Moreover, the controller 101 executes the third correction process at a time when the temperature value detected by the thermal sensor 14071, 14072, 14073, 14074 has exceeded a temperature threshold stored in the nonvolatile memory 104, at a time when a series of image formation processes that has made the temperature value detected by the thermal sensor 14071, 14072, 14073, 14074 exceed the temperature threshold ends or at an arbitrary time before the next image formation operation starts after this series of image formation operations ends. For example, the controller 101 executes the color distortion correction (B) based on the scanning result of the second test image scanned with the second amount of emitted light corresponding to the second input value.

As described above, the image forming apparatus 1 according to the embodiment executes the second correction process at a predetermined time in the cycle of 1,000 (excluding the cycle of 10,000) and executes the first correction process at a predetermined time in the cycle of 10,000. Accordingly, the image forming apparatus 1 does not execute both the first light amount correction (a) and the second light amount correction (b) in the series of correction processes and can prevent the series of correction processes from being prolonged. Moreover, the image forming apparatus 1 can maintain the image quality and save time by executing the second light amount correction for color distortion correction (b) at a higher frequency than the first light amount correction for image density correction (a).

Alternatively, the controller 101 may execute the second correction process at a predetermined time when the number of images as the formed output images has reached 1,000, 2,000, or 3,000, may execute the first correction process at a predetermined time when the number of images as the formed output images has reached 10,500, 20,500, or 30,500, and may execute the third correction process at a predetermined time when the detected temperature value has exceeded the temperature threshold. Also in this case, effects similar to those described above can be obtained.

FIG. 6 is a diagram showing a second example of the execution time (cycle) of the automatic correction according to the embodiment. The controller 101 of the image forming apparatus 1 selectively executes any one of a first correction process, a second correction process, a third correction process, or a fourth correction process on the basis of an execution condition (event change). Moreover, the controller 101 executes the second correction process at a higher frequency than the first correction process.

The respective correction processes are as follows. The first, second, and third correction processes are as described above. The fourth correction process includes the image density correction (A) (the fourth correction process: (A)) without the first light amount correction (a) and the second light amount correction (b).

The controller 101 selectively executes any one of the first correction process, the second correction process, or the fourth correction process in accordance with a first event change and also executes the third correction process in accordance with a second event change. The first and second event changes are described above.

For example, as shown in FIG. 6, when the number of images as the formed output images has reached 1,000, the controller 101 executes the second correction process at a time when the number of images as the formed output images has reached 1,000, at a time when a series of image formation operations by which the number of images as the formed output images has reached 1,000 ends, or at an arbitrary time before the next image formation operation starts after this series of image formation operations ends. For example, the controller 101 executes the second light amount correction (b) (corrects the second input value) and then executes the image density correction (A) based on the scanning result of the first test image scanned with the first amount of emitted light corresponding to the first input value.

Moreover, when the number of images as the formed output images has reached 2,000, the controller 101 executes the fourth correction process at a time when the number of images as the formed output images has reached 2,000, at a time when a series of image formation operations by which the number of images as the formed output images has reached 2,000 ends, or at an arbitrary time before the next image formation operation starts after this series of image formation operations ends. For example, the controller 101 executes the image density correction (A) based on the scanning result of the first test image scanned with the first amount of emitted light corresponding to the first input value without executing the first light amount correction (a) and the second light amount correction (b).

Similarly, the controller 101 executes the second correction process when the number of images as the formed output images has reached 3,000 or 5,000 and executes the fourth correction process when the number of images as the formed output images 4,000 or 6,000.

Moreover, when the number of images as the formed output images has reached 10,000, the controller 101 executes the first correction process at a time when the number of images as the formed output images has reached 10,000, at a time when a series of image formation operations by which the number of images as the formed output images has reached 10,000 ends, or at an arbitrary time before the next image formation operation starts after this series of image formation operations ends. For example, the controller 101 executes the first light amount correction (a) (corrects the first input value) and then executes the image density correction (A) based on the scanning result of the first test image scanned with the first amount of emitted light corresponding to the corrected first input value.

Similarly, the controller 101 executes the first correction process when the number of images as the formed output images has reached 20,000 or 30,000.

Moreover, the controller 101 executes the third correction process at a time when the detected temperature value has exceeded a temperature threshold stored in the nonvolatile memory 104, at a time when a series of image formation processes that has made the temperature value detected by the thermal sensor 14071, 14072, 14073, 14074 exceed the temperature threshold ends, or at an arbitrary time before the next image formation operation starts after this series of image formation operations ends. For example, the controller 101 executes the color distortion correction (B) based on the scanning result of the second test image scanned with the second amount of emitted light corresponding to the second input value.

As described above, the image forming apparatus 1 according to the embodiment alternately executes the second and fourth correction processes at a predetermined time in the cycle of 1,000 (excluding the cycle of 10,000) and executes the first correction process at a predetermined time in the cycle of 10,000. Accordingly, the image forming apparatus 1 does not execute both the first light amount correction (a) and the second light amount correction (b) in the series of correction processes and can prevent the series of correction processes from being prolonged by lowering the frequency of the second light amount correction (b). Moreover, the image forming apparatus 1 can maintain the image quality and save time by executing the second light amount correction for color distortion correction (b) at a higher frequency than the first light amount correction for image density correction (a).

FIG. 7 is a diagram showing an example of manual correction according to the embodiment. The controller 101 executes the image density correction (A), the first light amount correction (a), the color distortion correction (B), and the second light amount correction (b) alone or in combination on the basis of correction instructions input via the control panel 18.

For example, as shown in FIG. 7, the display 19 displays the first to ninth correction instructions and descriptions of executed corrections in a list. The user or the serviceman selects and inputs any one of the first to ninth correction instructions via the control panel 18.

The controller 101 executes the image density correction (A) on the basis of the input of the first correction instruction. Moreover, the controller 101 executes the color distortion correction (B) on the basis of the input of the second correction instruction. Moreover, the controller 101 executes the first light amount correction (a) on the basis of the input of the third correction instruction. Moreover, the controller 101 executes the second light amount correction (b) on the basis of the input of the fourth correction instruction.

Moreover, the controller 101 executes the first light amount correction (a) and the image density correction (A) on the basis of the input of the fifth correction instruction. Moreover, the controller 101 executes the second light amount correction (b) and the color distortion correction (B) on the basis of the input of the sixth correction instruction. Moreover, the controller 101 executes the second light amount correction (b) and the image density correction (A) on the basis of the input of the seventh correction instruction.

Moreover, the controller 101 executes the first light amount correction (a), the second light amount correction (b), and the image density correction (A) on the basis of the input of the eighth correction instruction. Moreover, the controller 101 executes the first light amount correction (a), the second light amount correction (b), the image density correction (A), and the color distortion correction (B) on the basis of the input of the ninth correction instruction.

The image forming apparatus 1 can execute the respective types of correction alone or in combination at an arbitrary time on the basis of inputs from the user or the serviceman. For example, the image forming apparatus 1 can execute the respective types of correction alone or in combination during the manufacturing process or initial setting.

As shown in FIG. 5 to FIG. 7, the controller 101 automatically or manually executes the correction processes and stores a history of correction processes in the nonvolatile memory 104. For example, the history of correction processes includes triggers for correction processes (types of events that have occurred) and dates and times of execution. The communication I/F 105 sends identification information specific to the image forming apparatus 1 and the history of correction processes to the server at a predetermined time. The server manages the history of correction processes executed by each image forming apparatus 1 on the basis of the identification information.

Figure 8:
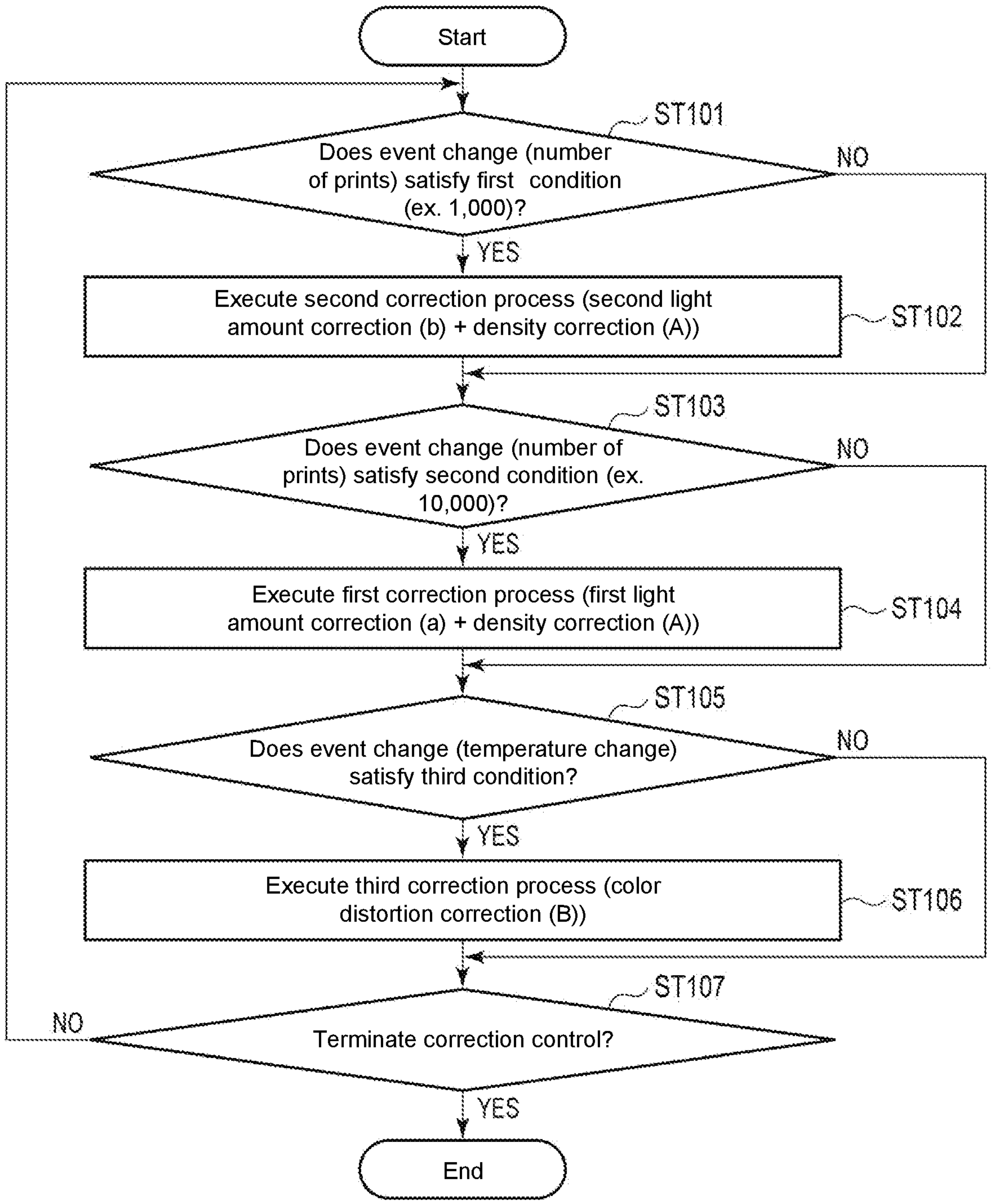
FIG. 8 is a flowchart for describing a first example of the automatic correction according to the embodiment.

FIG. 8 is a flowchart for describing a first example of automatic correction according to the embodiment. In Step ST101, the controller 101 monitors whether or not the event change satisfies a first condition. For example, when the number of prints has reached 1,000, the controller 101 determines that the event change satisfies the first condition (YES in Step ST101). Then, in Step ST102, the controller 101 executes the second correction process at a predetermined time. The second correction process includes the second light amount correction (b) and the density correction (A). In addition, when the number of prints has reached 2,000, the controller 101 determines that the event change satisfies the first condition again (YES in Step ST101). Then, the controller 101 executes the second correction process at a predetermined time again in Step ST102.

Then, the processing of the controller 101 shifts to Step ST103. In Step ST103, the controller 101 monitors whether or not the event change satisfies the second condition. When the number of prints has reached 10,000, the controller 101 determines that the event change satisfies the second condition (YES in Step ST103). Then, the controller 101 executes the first correction process at a predetermined time again in Step ST104. The first correction process includes the first light amount correction (a) and the density correction (A).

Moreover, in Step ST105, the controller 101 monitors whether or not the event change satisfies the third condition. When the detected temperature value has exceeded the temperature threshold, the controller 101 determines that the event change satisfies the third condition (YES in Step ST105). Then, in Step ST106, the controller 101 executes the third correction process at a predetermined time.

Subsequently, in Step ST107, the controller 101 determines whether or not the correction control has ended. The controller 101 repeats the processing of Steps ST101 to ST106 in a case of continuing the correction control (NO in Step ST107).

Figure 9:
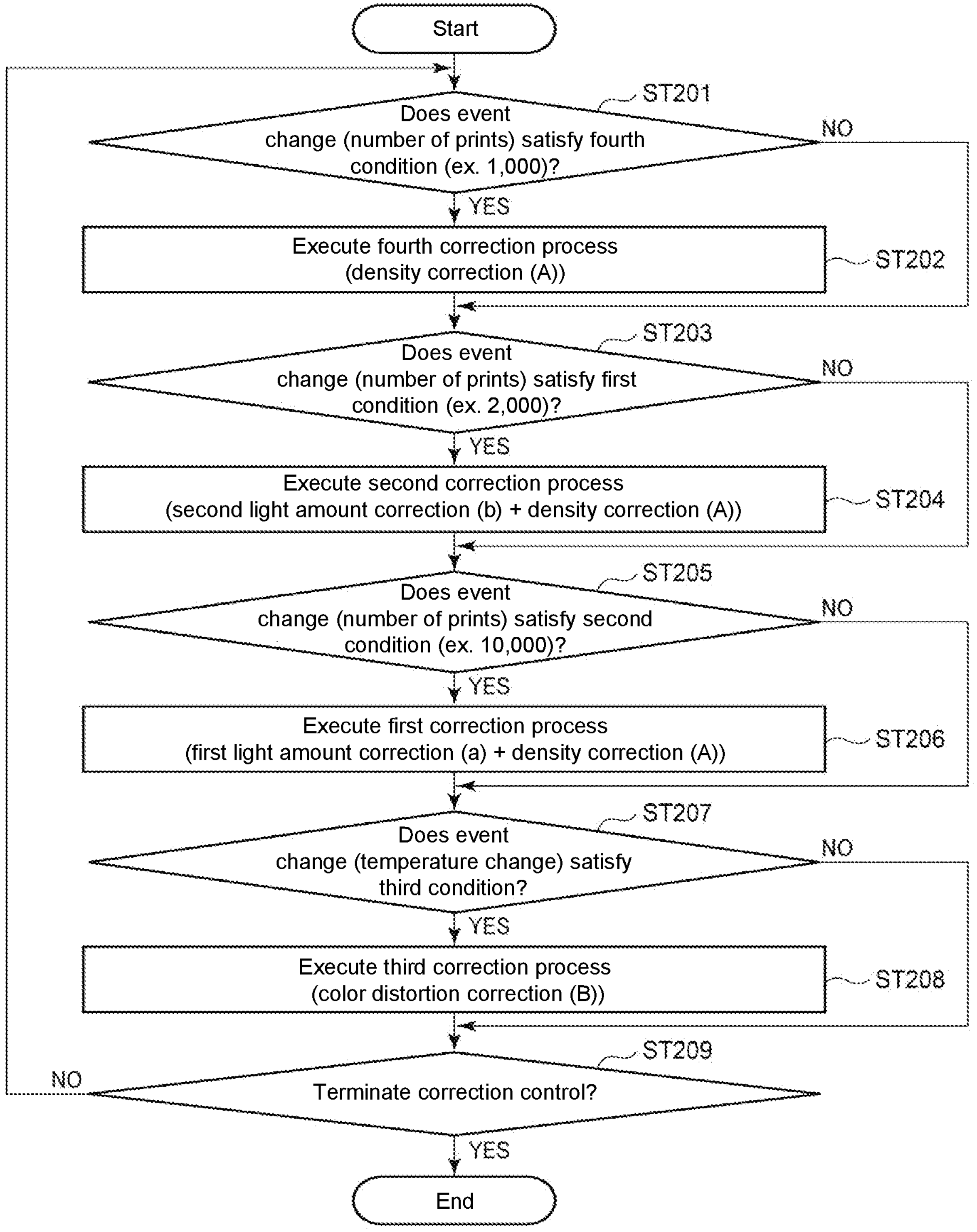
FIG. 9 is a flowchart for describing a second example of the automatic correction according to the embodiment.

FIG. 9 is a flowchart for describing a second example of automatic correction according to the embodiment. In Step ST201, the controller 101 monitors whether or not the event change satisfies the fourth condition. For example, when the number of prints has reached 1,000, the controller 101 determines that the event change satisfies the fourth condition (YES in ST201). Then, in Step ST202, the controller 101 executes the fourth correction process at a predetermined time (ST202). The fourth correction process includes the density correction (A) without the first light amount correction (a) and the second light amount correction (b). Subsequently, the processing of the controller 101 shifts to Step ST203. In Step ST203, the controller 101 monitors whether or not the event change satisfies the first condition. When the number of prints has reached 2,000, the controller 101 determines that the event change satisfies the first condition (YES in ST203). Then, in Step ST204, the controller 101 executes the second correction process at a predetermined time.

In addition, in Step ST201, when the number of prints has reached 3,000, the controller 101 determines that the event change satisfies the fourth condition again (YES in ST201). Then, the controller 101 executes the fourth correction process at a predetermined time again in Step ST202. In addition, in Step ST203, when the number of prints has reached 4,000, the controller 101 determines that the event change satisfies the first condition again (YES in ST203). Then, in Step ST204, the controller 101 executes the second correction process at a predetermined time.

Then, in Step ST205, the controller 101 monitors whether or not the event change satisfies the second condition. In Step ST205, when the number of prints has reached 10,000, the controller 101 determines that the event change satisfies the second condition (YES in ST205). Then, in Step ST206, the controller 101 executes the first correction process at a predetermined time. The first correction process includes the first light amount correction (a) and the density correction (A).

Moreover, in Step ST207, the controller 101 monitors whether or not the event change satisfies the third condition. In Step ST207, when the detected temperature value has exceeded the temperature threshold, the controller 101 determines that the event change satisfies the third condition (YES in ST207). Then, in Step ST208, the controller 101 executes the third correction process at a predetermined time.

Subsequently, in Step ST209, the controller 101 determines whether or not the correction control has ended. The controller 101 repeats the processing of Steps ST201 to ST208 in a case of continuing the correction control (NO in ST209).

Figure 10:
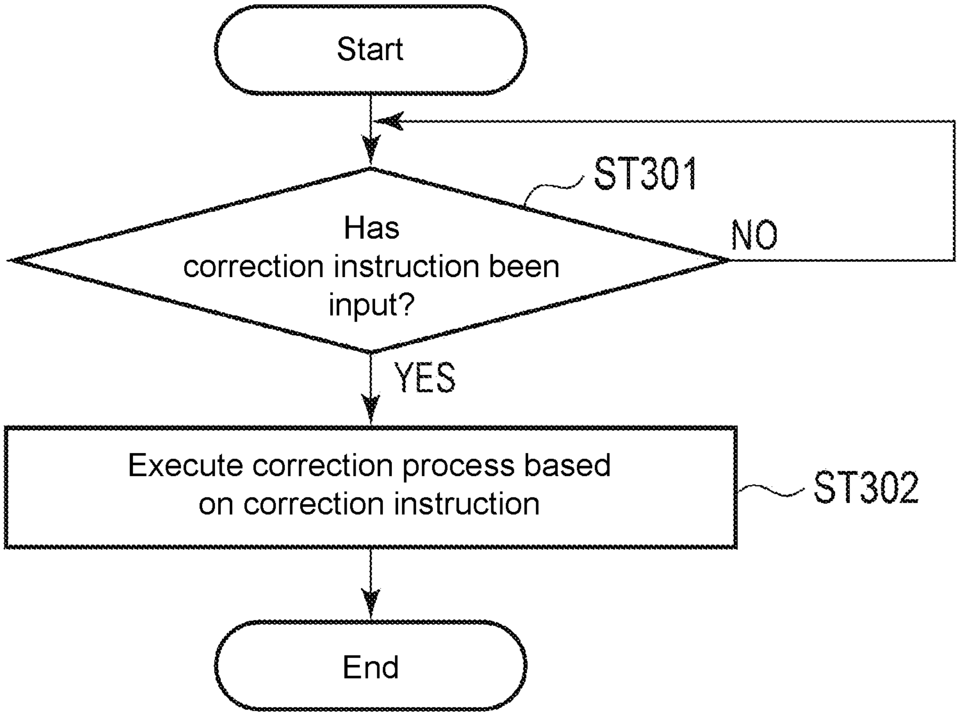
FIG. 10 is a flowchart for describing an example of the manual correction according to the embodiment.

FIG. 10 is a flowchart for describing an example of the manual correction according to the embodiment. In Step ST301, the controller 101 waits for a correction instruction to be input via the control panel 18. When the correction instruction is input via the control panel 18 (YES in Step ST301), the processing of the controller 101 shifts to Step ST302. In Step ST302, the controller 101 executes the image density correction (A), the first light amount correction (a), the color distortion correction (B), and the second light amount correction (b) alone or in combination on the basis of an input correction instruction.

In the present embodiment, the case where the correction processes are executed using the execution conditions (event occurrence) shown in FIGS. 5 and 8 or FIGS. 6 and 9 as the triggers for the correction processes has been described. However, the execution conditions are not limited to such execution conditions. The serviceman or the like may arbitrarily set or change the execution conditions via the control panel 18. For example, the cycle of 2,000 or 3,000 may replace the cycle of 1,000 and the cycle of 20,000 may replace the cycle of 10,000.

Moreover, the controller 101 may change the density correction frequency on the basis of a density correction result or the controller 101 may change the color distortion correction frequency on the basis of a color distortion correction result.

Moreover, the communication I/F 105 communicates with the server and receives an operation program or the like at a predetermined time and the controller 101 updates the operation program stored in the nonvolatile memory 104 to the received operation program. The server may change the trigger at the time of updating this operation program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus that forms an image with a plurality of colors, comprising:
- an image forming device that forms a first test image on a basis of first test image data associated with a plurality of colors and forms a second test image on a basis of second test image data associated with a plurality of colors;
- a scanning device that scans the first test image with a first amount of emitted light corresponding to a first input value and scans the second test image with a second amount of emitted light corresponding to a second input value; and
- a controller that selectively executes any one of a first correction process, a second correction process, or a third correction process on a basis of an event change, wherein
- the first correction process includes a first light amount correction process of correcting the first input value so as to maintain the first amount of emitted light and an image density correction process of correcting density of the image to be formed on a basis of a result of scanning the first test image,
- the second correction process includes a second light amount correction process of correcting the second input value so as to maintain the second amount of emitted light and the image density correction process, and
- the third correction process includes a color distortion correction process of correcting color distortion of the image to be formed on a basis of a result of scanning the second test image.

2. The image forming apparatus according to claim 1, wherein
- the image forming device forms an image on a basis of image data associated with a plurality of colors to be input, and
- the event change includes an actual result that an image has been formed by the image forming device.

3. The image forming apparatus according to claim 2, wherein
- the controller selectively executes either one of the first correction process and the second correction process in accordance with the actual result that the image has been formed.

4. The image forming apparatus according to claim 3, wherein
- the event change further includes a temperature change of the image forming apparatus, and
- the controller executes a third correction process in accordance with the temperature change in accordance with the actual result that the image has been formed.

5. The image forming apparatus according to claim 1, wherein
- the event change includes a temperature change of the image forming apparatus.

6. The image forming apparatus according to claim 5, wherein
- the controller executes the third correction process in accordance with the temperature change in accordance with the actual result that the image has been formed.

7. The image forming apparatus according to claim 1, wherein the controller executes the second correction process at a higher frequency than the first correction process.

8. The image forming apparatus according to claim 1, wherein the controller executes a fourth correction process in accordance with an event change, and the fourth correction process includes the image density correction process without the first light amount correction process and the second light amount correction process.

9. The image forming apparatus according to claim 1, wherein the controller executes a fourth correction process on a basis of an input of a correction instruction, and the fourth correction process includes the first light amount correction process, the second light amount correction process, and the image density correction process.

10. A control method for an image forming apparatus that forms an image with a plurality of colors, comprising:

forming, by an image forming device, a first test image on a basis of first test image data associated with a plurality of colors and forms a second test image on a basis of second test image data associated with a plurality of colors;

scanning, by a scanning device, the first test image with a first amount of emitted light corresponding to a first input value and scans the second test image with a second amount of emitted light corresponding to a second input value; and selectively executing, by a controller, any one of a first correction process, a second correction process, or a third correction process on a basis of an event change, wherein the first correction process includes a first light amount correction process of correcting the first input value so as to maintain the first amount of emitted light and an image density correction process of correcting density of the image to be formed on a basis of a result of scanning the first test image, the second correction process includes a second light amount correction process of correcting the second input value so as to maintain the second amount of emitted light and the image density correction process, and the third correction process includes a color distortion correction process of correcting color distortion of the image to be formed on a basis of a result of scanning the second test image.

* * * * *